Patented May 10, 1938

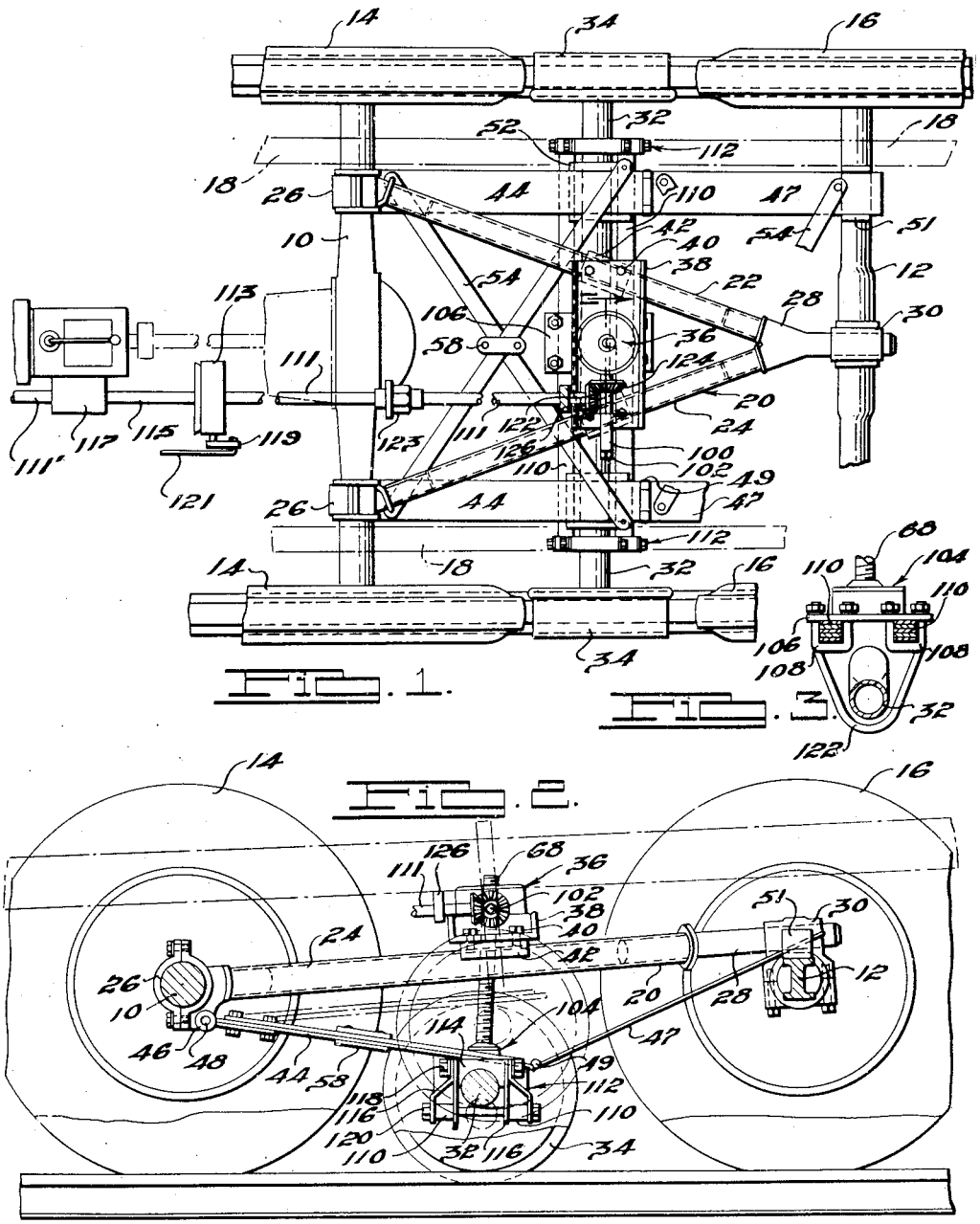

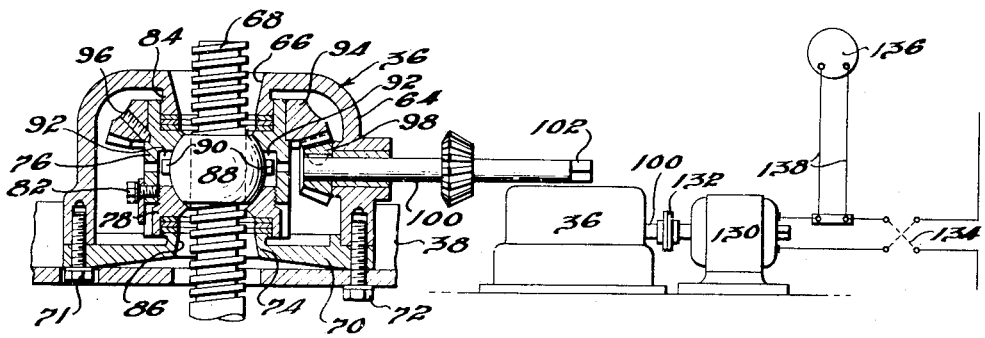
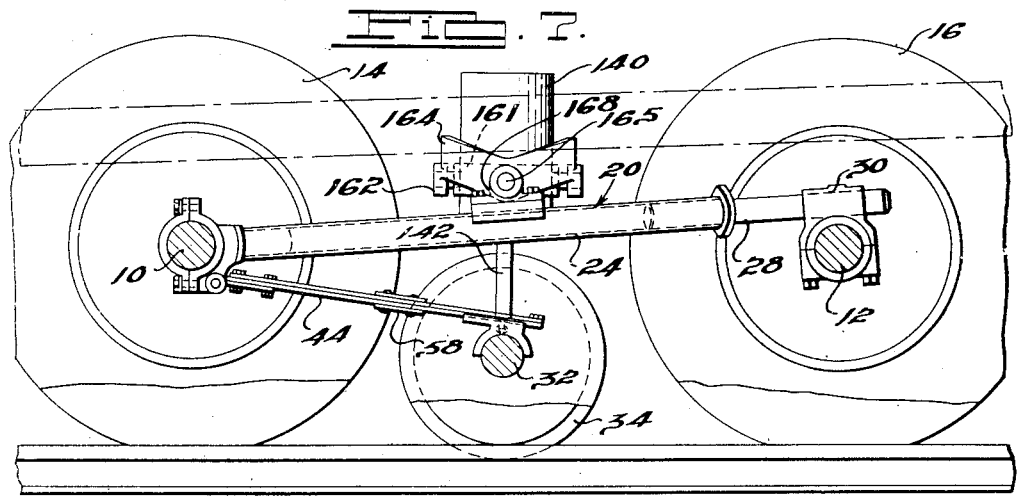
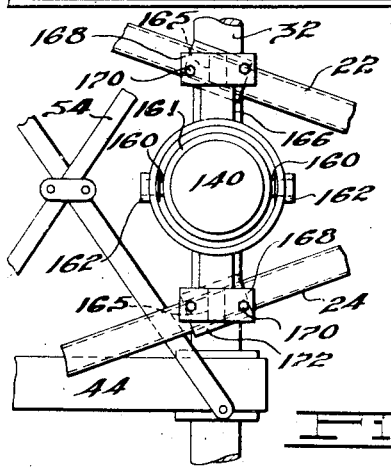
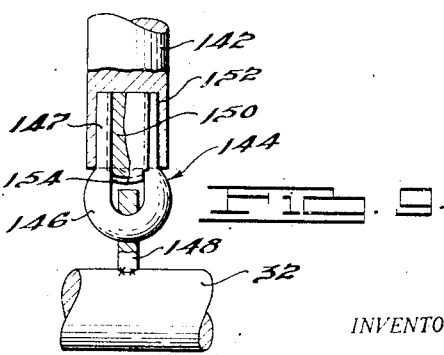
INVENTOR.
Sulo M. Nampa.
BY
Harness, Dickey, Pierce & Hann
ATTORNEYS.

2,116,797

UNITED STATES PATENT OFFICE 2,116,797

COMBINED ROAD AND RAIL VEHICLE

Sulo M. Nampa, Detroit, Mich., assignor to Transportation Systems, Inc., a corporation of Oklahoma Application November 18, 1935, Serial No. 50,384

13 Claims. (Cl. 105—215)

The present invention relates to vehicles adapted for either rail or road operation, and more particularly to pilot devices for use in such vehicles, and to improved means for supporting and for raising and lowering such devices with respect to the roadway.

Objects of the present invention are to provide improved mechanism to raise and lower the pilot axle of a combined road and rail vehicle from and to track engaging position; to provide such raising and lowering mechanism embodying means universally connected to the pilot axle, and universally connected to the vehicle; to provide, in one embodiment, a fluid pressure actuated device for raising and lowering the pilot axle, universally supported upon the vehicle through an improved cradle and to provide, in another embodiment, a mechanically actuated raising and lowering mechanism.

Other objects of the present invention are to provide an improved universal joint type jack adapted to raise and lower the pilot axle of a combined road and rail vehicle; to provide a jack of this character embodying a threaded shaft which passes axially through one of the elements of a universal joint and may be raised or lowered by rotating the universal joint elements with respect to it; to provide such a construction in which one end of the threaded shaft is universally connected to the pilot axle and in which the universal joint mechanism is connected to the vehicle; to provide such a structure in which the universal joint is of the ball and socket type, the threaded shaft passing through the ball, and the socket mechanism being adapted for connection to an external source of power to rotate it and, consequently, to raise and lower the shaft.

Further objects of the present invention are to provide for actuating the pilot axle raising and lowering mechanism by a moving part of the vehicle; to provide such means embodying a power take-off member which may be selectively connected to pilot mechanism for the front or rear axles, and arranged to either raise or lower such pilot mechanism; to provide an electrically driven system for raising and lowering the pilot axle; to provide raising and lowering mechanism which may selectively be actuated either manually or automatically; and to provide means for conveniently indicating within the vehicle the proportion of the vehicle load which is transmitted to the pilot axle.

Further objects of the present invention are to provide a combined road and rail vehicle having main and pilot axles, in which the pilot axle is suspended from a vehicle under frame member which is independent of the movement of the vehicle body as effected by different loads thereon; to provide a combined road and rail vehicle having double main axles forming a main truck, in which the pilot axle is supported from such main axles and positioned between them and embodying improved aligning means between the main and pilot axles; to provide a combined road and rail vehicle having a pair of main axles forming a truck, in which such main axles are connected together by a Y frame which positively maintains the wheels associated therewith in alignment; and in which the pilot axle and its raising and lowering mechanism is suspended directly from the Y frame.

With the above and other objects in view, which appear in the following description and in the appended claims, an illustrative embodiment of the present invention is shown in the accompanying drawings, throughout which corresponding reference characters are used to designate corresponding parts, and in which:

Figure 1 is a top plan view of the rear main truck of a combined road and rail vehicle embodying the present invention;

Fig. 2 is a view in side elevation corresponding to Figure 1;

Figs. 3 and 4 are detail views based upon Figs. 1 and 2;

Fig. 5 is a detail view in vertical central section of the improved universal jack of the present invention;

Fig. 6 is a partial view of modified actuating means for the raising and lowering mechanism, and Figs. 7, 8, and 9 are views of a modified construction of raising and lowering mechanism.

Combined road and rail vehicles of the general type to which the present invention relates may comprise, in general, a motor vehicle having a frame or body portion sprung in a conventional way on front and rear main axles, which function during road travel to drive the vehicle in the usual way. Front and rear pilot axles are provided which serve, during track travel, to guide and retain the main wheels on the tracks. An arrangement of this general character is disclosed and certain features thereof claimed in Patent No. 2,002,901, granted May 28, 1935, to David W. Main.

In accordance with the present invention, it is preferred to utilize at least one main truck, comprising a pair of spaced main axles, each of which carries a pair of main wheels, and to position a pilot axle, carrying a pair of pilot wheels, between the two main axles. Means are preferably provided to maintain the pilot axle and the main axles accurately in alignment with each other, preventing any lateral displacement between the axles, to insure that during track travel the main wheels will be positively maintained upon the track.

In the illustrated forms a Y-frame is connected between the two main axles, the connection being such as to permit relatively free vertical movement of one main axle relative to the other main axle, and to also permit limited raising of one wheel of either axle with respect to the other wheel of the same axle. The Y-frame positively retains the main wheels in alignment with each other. Additional means is provided to align the pilot wheels with the main wheels. In one illustrated form, aligning means connect the pilot axle and both main axles, and this means also supplements the aligning action of the Y-frame. In another illustrated form, the additional aligning means extend between the pilot axle and only one of the main axles and the Y-frame is relied upon to align the pilot axle and the other main axle.

An important feature of the present invention resides in utilizing the Y-frame to support the mechanism for raising and lowering the pilot axle and wheels from and into engagement with the track. This method of supporting the pilot axle raising and lowering mechanism is advantageous in that it renders the pilot axle independent of the upward and downward movements of the vehicle body, such as occur during operation of the vehicle. This form of suspension also simplifies the problem of properly proportioning the vehicle load between the main and pilot axles, since the proportioning operation is not affected by the varying heights of the vehicle frame from the track, as determined by such loads. A further advantage of this method of suspending the pilot mechanism is that the same mechanism which is provided to maintain the main axles in alignment may also be utilized as the suspension mechanism.

The present invention also provides improved raising and lowering mechanisms for the pilot axle, consisting, in one illustrated form, of a universal jack secured to the previously mentioned Y-frame, and having a threaded shaft which passes through one element of the universal jack and is in turn universally connected to the pilot axle. The universal jack elements are arranged for rotation within the housing provided therefor, and this rotation causes upward and downward movement of the pilot axle shaft through the universal jack.

The drawings illustrate several different ways of controlling the universal jack, to raise and lower the pilot axle. In one illustrated form, the universal jack is connected, through suitable gearing and a selectively operable reversible type clutch, to a conventional power take-off which may be attached in the usual way to the vehicle transmission. The clutch is preferably conveniently controllable from within the vehicle, to either connect the jack to the power take-off to lower the pilot axle or to raise it. A feature of this arrangement is in utilizing a single power take-off device to selectively and independently control raising and lowering mechanisms for the pilot axles associated with both the front and the rear ends of the vehicle. Preferably also, the arrangement is such that the universal jack may be manually actuated to raise and lower the pilot axle, without interfering with the just mentioned automatic mechanism. In accordance with a second illustrated arrangement, the actuating shaft of the universal jack is coupled to an electric motor, which may be started and stopped and selectively reversed from the interior of the vehicle. A feature of this arrangement is the provision of an indicating device positioned within the vehicle, which responds to the load upon the electric motor, and thus serves as a measure of the proportion of the vehicle load which is transmitted to the pilot axle upon the lowering thereof to track engaging position. In accordance with a second illustrated embodiment, a fluid pressure cylinder is universally mounted, by means of an improved cradle, upon the previously mentioned Y-frame, and the piston rod thereof is universally connected to the pilot axle.

Considering the above mentioned elements in more detail, and referring to Figs. 1 through 5 of the drawings, a pair of main axles 10 and 12, and associated wheels 14 and 16, respectively, may be connected to the vehicle frame 18 in any conventional manner to form a double rear truck. Axles 10 and 12 are also interconnected by a wishbone or Y-frame 20, the arms 22 and 24 of which are respectively rotatably connected to axle 10 by the yokes 26, and are joined together by a single member 28. Member 28 in turn is rotatably connected to axle 12, for rotation about the axis of axle 12 by the yoke 30. The end of member 28 is slidable within yoke 30, thus permitting the spacing between axles 10 and 12 to increase or decrease. Such movement is limited, it will be understood, by the usual connections between axles 10 and 12 and frame 18. The forked legs of member 28 are secured within the cored out ends of arms 22 and 24. With this arrangement, it will be understood that either axle 10 or 12 may move upwardly or downwardly with respect to the other axle. Lateral or crosswise movements between axles 10 and 12 are, however, positively prevented by the wishbone 20, so that the wheels 14 and 16 are continuously and positively maintained in accurate alignment.

A pilot axle 32, provided with flanged pilot wheels 34, is interposed between axles 10 and 12 and thus provides a positive guide for them. In certain instances it may be desirable to provide the wheels 14 and 16 with flanged portions in addition to the illustrated tread portions, the flanged portions being utilized during rail travel and the tread portions being utilized during highway travel. As illustrated, however, the tread portions are utilized for both rail and highway travel and for this reason, the axial spacing between the flanged pilot wheels 34 corresponds to the axial spacing between the wheels 14 and 16.

Proper alignment between the pilot wheels and the main wheels is provided by a jointed cross frame. In view of the fact that the main axles 10 and 12 are independently retained in alignment by the Y-frame, it is found to be satisfactory in certain cases to provide an aligning connection between pilot axle 32 and only one of the main axles, and to rely upon the Y-frame to align the pilot axle with the other main axle. In the embodiment now being described, however, the cross frame connects the pilot axle and both main axles. The cross frame thus supplements the aligning action of the Y-frame.

The illustrated cross frame comprises a pair of similar arms 44 which extend between pilot axle 32 and main axle 10. The forward end of each arm 44 is pivotally connected to axle 10 by a pin 48 which is received in an eye 46 formed integrally with the previously mentioned yoke 26, thus permitting free pivotal movement between each arm 44 and axle 10. The rear end of each arm 44 is secured, as by welding, to a seat 52 formed on or secured to the pilot axle 32. The arms 47, which are similar to, and are pivotally secured to the ends of, the just mentioned arms 44, by the pins 49, extend from pilot axle 32 to the rear main axle 12. The rear ends of the arms 47 are freely seated in U-shaped brackets 51 suitably secured upon axle 12. The legs of each bracket 51 guide the associated arm 47, and permit free vertical movement between such arm and axle 12. It will be understood that the length of the legs of the brackets 51 exceeds the expected vertical movement between the associated arm and the axle, so that each arm 47 is continuously guided during operation. The connection thus afforded permits a relatively free swinging in a vertical plane of pilot axle 32 with respect to either main axle 10 or 12, and also permits relative vertical movement between the main axles 10 and 12. The cross arms 44 and 47 are interconnected respectively by struts 54, the midpoints of which are connected together by clips 58.

It will be understood that an alternative arrangement may be used, in which the cross frame is pivotally connected to the rear main axle 12 and is freely seated upon the forward main axle 10. In this instance, a bracket construction, such as shown in Figure 4, may be used to connect the rear ends of the arms 47 to axle 12. In Figure 4, the end of each arm 47 is pivotally connected by pin 53 to a boss 55 formed on one of the two clamping members 56. The clamping face of each clamp member 56 is shaped to conform generally to the I section of axle 12. A stud 57 passes through openings formed near the ends of the clamp members 56 and draws these members positively into engagement with axle 12, thus securing the bracket in place. A nose 57a may be formed on one of the members to correctly space the lower parts of the two.

As will be evident, the arms 44 and 47 and the cross structs 54 constitute a relatively rigid frame, which engages the main and pilot axles at points spaced substantial distances from the centers thereof, and acts to substantially eliminate any lateral or crosswise movement of the pilot axle with respect to either main axle. Proper alignment between the main axles is also maintained by the Y-frame.

The cross frame through the hinged connections with the main axle 10, and slide connection with axle 12, however, permit a relatively free vertical movement of the pilot axle with respect to each main axle, such for example as may be encountered in operation due to track irregularities and such, of course, as is accompanied by a raising operation of pilot axle 32 from the track engaging position as described below. It is noted that the raising and lowering of the pilot wheels as affected by track irregularities may be different for each wheel and consequently one pilot wheel 34 may be raised from the track-way while the other wheel remains in engagement with the track-way. Under such conditions, a rotation of the pilot axle about such engaging pilot wheel as a center results. If the frame comprising the arms 44 and 47 and struts 54 were in fact absolutely rigid, it is recognized that this tilting could not occur and that an irregularity of either track would, therefore, raise or lower both pilot wheels simultaneously. It has been found in practice, however, that the frame comprising arms 44 and 47, and struts 54 may be made sufficiently rigid to reduce lateral or crosswise movements between the main and pilot axles to a permissible degree and still permit any required amount of raising of one pilot wheel without affecting the position of the other pilot wheel. The Y-frame also permits the independent raising and lowering of the wheels with respect to each other, so that the entire assembly provides an effective aligning means for the main and pilot wheels.

In Figs. 1 through 5, the raising and lowering of the pilot axle 32 from and into engagement with the tracks, as well as the application of a desired proportion of the vehicle load to the pilot axle during track travel are effected by an improved construction of universal jack 36, which is entirely suspended from the previously mentioned Y-frame 20. As will be evident, the Y-frame 20 is moved up and down during operation only to the extent that the axles 10 and 12 are moved up and down due to track irregularities, and is substantially independent of the up and down movements of the vehicle body during operation. A substantial operating advantage is found in suspending the pilot mechanism from the Y-frame, and thus rendering it independent also of such vehicle body movement.

The supporting structure for the universal jack 36 comprises an inverted channel plate 38 which spans the two arms 22 and 24 at points intermediate their ends, and is secured thereupon by studs 40 and seats 42, which are, in turn, secured upon the arms 22 and 24.

The universal jack 36 is illustrated in detail in Fig. 5 and comprises a housing 64 which is generally cup-shaped, and the base of which includes the flared opening 66 through which the actuating screw 68 extends. The underside of housing 64 is closed by a cover 70 which is secured thereto by the studs 71 and additional studs 72 which also connect the jack to channel 38. Cover 70 is provided with a corresponding flared opening 74 through which screw 68 also extends. The oppositely disposed cup members 76 and 78, which are threaded together at 80 and locked in place by a stud and clip 82, are fitted over bosses 84 and 86 formed in housing 64 and cover 70, respectively, and form a socket in which the internally threaded ball 88 is supported for universal movement. The oppositely disposed lugs 90 which form a part of ball 88 are received in elongated recesses 92 formed within the cup members 76 and 78 and serve to prevent rotation of ball 88 within the cup members in one plane, but to freely permit such rotation in a plane normal to such plane.

The bevel gear 94 may be formed integrally, or suitably removably secured by the lock pin 96, at the upper edge of cup member 76 and mates with a corresponding gear 98 which is secured upon a shaft 100 which extends outwardly from housing 64 and terminates in a nut 102. With this arrangement, it will be understood that rotation of shaft 102 effects corresponding rotation of the interconnected cup members 76 and 78 through the gears 94 and 98. The rotation of cup members 76 and 78 correspondingly drives the internally threaded ball 88 through the lugs 90.

The lower end of screw 68 is universally connected by a ball joint 104 to a plate 106. Plate 106 in turn is suitably secured, as by U-bolts 108, on the upper surface and at the midpoint of a pair of transverse springs 110, the opposite ends of which are underhung from pilot axle 32 through shackles 112. Each shackle 112 comprises a yoke 114 secured upon axle 32, to which the downwardly extending shackle arms 116 are secured by studs 118. The lower ends of the arms are retained in assembled relation by studs 120. Each stud 120 also provides a pivotal support from one end of both springs. A stirrup 122 limits relative vertical movement between axle 32 and springs 110. As will be evident, springs 110 afford a resilient connection between pilot axle 32 and the Y-frame, which permits slight relative vertical movement therebetween.

As best shown in Figure 1, the jack shaft 100 extends out of the casing far enough to permit ready access to the squared portion 102 thereof from the side of the vehicle, and it will be evident that manual rotation of shaft 100 through the squared portion 102 correspondingly raises or lowers the pilot axle 32.

The automatic mechanism for effecting the rotation of jack shaft 100 to correspondingly raise and lower pilot axle 32 and also to apply a desired proportion of the vehicle load to pilot axle 32 comprises, in Figure 1, a shaft 111 which extends longitudinally of the vehicle and is connected through a reversing clutch mechanism 113 to a short shaft 115. Shaft 115, in turn, is connected through a conventional power take-off 117 to the vehicle transmission. Power take-offs of the just stated type being well known, it is considered unnecessary to illustrate the details thereof, it being understood that shaft 115 is continuously rotated in timed relation to the rotation of the vehicle drive shaft. Similarly, reversing clutch mechanisms being well known, it is considered unnecessary to illustrate the details of clutch mechanism 113. It being understood that clutch 113 may be selectively actuated to connect shaft 111 to shaft 115 for rotation in either a raising or a lowering direction. As illustrated, a crank arm 119 is provided to actuate clutch 113 and it will be understood that movement thereof in one direction connects shaft 111 to shaft 115 for rotation in one direction, and movement of crank arm 119 in the opposite direction connects shaft 111 to shaft 115 for rotation in the opposite direction. Crank arm 119 is preferably controllable from the interior of the vehicle, through a push pull connection including the Bowden wire 121. Shaft 111 also includes a universal joint 123 to absorb any relative movement between the clutch 113 and the jack shaft 100. A bevel gear 122 secured upon shaft 111 for rotation thereby engages and effects corresponding rotation of a bevel gear 124 secured upon jack shaft 100. The numeral 126 represents a suitable bearing for the rear end of shaft 111, and may be suitably secured to the previously mentioned channel member 38. It will be understood that clutch 113 may be suitably supported from the vehicle frame to correspondingly provide a support for the front end of shaft 111 and the rear end of the short shaft 115. A shaft 111' extends forwardly from the power take-off 117 and it will be understood that this shaft is connected to mechanism corresponding in all respects to that just described to the raising and lowering mechanism associated with the pilot axle at the forward end of the vehicle.

From the foregoing it will be evident that rotation of jack shaft 100 through either the manual connection represented by nut 102, or through the automatic connection to the power take-off through shaft 111, correspondingly rotates ball 88 associated with jack 36 to cause the screw 68 to be raised or lowered. The raising and lowering of screw 68 is transmitted to pilot axle 32 and pilot wheels 34 through the ball joint 104 and the transverse springs 110, the latter forming, as previously stated, a resilient connection between the pilot axle and the jack assembly. In raising the pilot axle 32 from the track engaging position shown in Figure 2 to a higher position, the cross frame members 44 swing about their pivots 48 and the cross frame members 47 swing about their pivots 49 and also slide to some extent within the guides 51 provided therefor upon axle 12. It will be understood also that the proportion of the vehicle load which is carried by the pilot axle 32 and pilot wheels 34 when in track engaging position is determined by the degree to which the jack screw 68 is lowered. In some instances, it may be desirable to provide positive means to lock the raising and lowering mechanism in a selected track engaging position to prevent a forcible raising of the pilot axle. Preferably, however, the lead of the threads on screw 68 is so selected that jack 36 will remain, against the force of the load transmitted through it, in any position of adjustment to which the shaft 100 thereof is turned either by nut 102 or through shaft 111.

Referring to the modified construction shown in Figure 6, an electric motor 130 is connected to shaft 100 of jack 36 through a coupling 132. A suitable and conventional reversing switch 134, preferably positioned within the vehicle, is interposed in the armature circuit of motor 130 and as will be understood, may be selectively closed to cause motor 130 to drive jack 36 to either raise or lower the pilot axle. A feature of this arrangement is the provision of a conventional indicating meter 136 positioned within the vehicle cab, and connected through conductors 138 to respond to the armature current drawn by motor 130. Meter 136, accordingly, functions as a measure of the work being done by motor 130, and thus measures the proportion of the vehicle load which is transmitted to the pilot axle.

In the further modification shown in Figures 7, 8, and 9, pilot axle 32 is adapted to be raised and lowered by a fluid pressure mechanism comprising a fluid pressure cylinder 140 supported as hereinafter described upon the previously mentioned Y-frame 20 and having a piston rod which is universally connected to pilot axle 32.

Cylinder 140 may be of conventional construction and is provided near its base with a surrounding ring 161. Trunnions 160 have rotative bearings in diametrically opposed journals formed in the ring 161 and in bosses 162 which form part of a cradle 164, and thus form a pivotal connection between cylinder 140 and cradle 164. Cradle 164 is correspondingly pivotally mounted upon the Y-frame 20, for rotation about an axis normal to the axis of trunnions 160, through the trunnions 165 which are formed as reduced portions of the outwardly extending portions 166 of cradle 164. The trunnions 165 are rotatably supported in bearing brackets 168 which are secured upon seats 172 by studs 170. Seats 172 correspond in all respects to the seats 42 described with reference to Figure 1. Through its pivotal connection to cradle 164, and the pivotal connection of the latter to the Y-frame 20, cylinder 140 is thus universally mounted with respect to Y-frame 20.

The universal joint connection between piston 142 and pilot axle 32 may be of any desired type, such for example as the ball joint described with reference to Figure 3, but is illustrated as of the type embodied in the copending application of the present applicant, Serial No. 735,774, filed July 18, 1934.

As described in more detail in that application, the joint comprises generally the two interlinked eyes 146 and 148. The eye 148 is suitably secured to pilot axle 32 as by welding. Eye 146 is of a hairpin or U-shape, provided with leg portions 147 adapted to be received within the tubularly formed lower end portion 152 of the piston rod 142. The leg portions 147 are substantially oval in cross section with the outer faces thereof conforming substantially to the curvature of the inner periphery of the tubular portion 152. A plug 150 is adapted to be disposed within the tubular portion 152 and is of such cross section that in conjunction with the legs 147, it substantially fills the end of the tubular portion 152.

In assembling the elements above described, one leg 147 of the arm 146 is projected through the eye portion of eye 148. The plug 150 is then disposed between the legs 147, and the legs and plug are then inserted within the tubular portion 152. In assembled relation, a weld is formed between the tubular portion 152, the legs 147 and the plug 150.

The fluid connections for controlling cylinder 140 may be arranged as described in the above identified Main patent, and have not been illustrated. Preferably a compressible fluid, such as air, is used to form a resilient connection between frame 20 and axle 32, and permitting the previously described transverse springs 110 to be dispensed with.

Although specific embodiments of the present invention have been described, it will be evident that various changes in the form, number and arrangement of parts may be made therein within the spirit and scope of the present invention.

What is claimed is:

1. The combination in a combined road and rail vehicle for road and rail travel, having a main truck comprising a pair of related main axles and main wheels therefor and having means for suspending said main truck from said vehicle, of means comprising a pilot axle and pilot wheels therefor for guiding said main truck wheels in engagement with said rails and positioned between said main axles, and means independent of said main truck suspending means for transmitting a portion of the load on said main truck directly from said main truck to said pilot axle.

2. The combination in a combined road and rail vehicle having a main truck comprising a pair of related main axles and having means for suspending said main truck from said vehicle, of means comprising a pilot axle positioned between said main axles for guiding said main truck during rail travel of said vehicles, and means comprising a connection between said main axles independent of said suspending means for raising and lowering said pilot axle from and to rail engaging position.

3. The combination in a combined road and rail vehicle having a main truck comprising a pair of related main axles and having means for suspending said main truck from said vehicle, of means comprising a pilot axle positioned between said main axles for guiding said main truck during rail travel of said vehicle, an underframe connecting said main axles, and means carried by said underframe for raising and lowering said pilot axle from and to said rail engaging position.

4. The combination in a combined road and rail vehicle having a main truck comprising a pair of related main axles and having means for suspending said main truck from said vehicle, of means comprising a pilot axle positioned between said main axles for guiding said main truck during rail travel of said vehicle, an aligning underframe connecting said main axles for preventing lateral displacement between said main axles, and means carried by said underframe for raising and lowering said pilot axle from and to rail engaging position.

5. The combination in a combined road and rail vehicle having a main truck comprising a pair of related main axles and having means for suspending said main truck from said vehicle, of means comprising a pilot axle positioned between said main axles for guiding said main truck during rail travel of said vehicle, an aligning underframe interconnecting said main axles for preventing lateral displacement between said main axles, and an aligning connection between said pilot axle and one of said main axles.

6. The combination in a combined road and rail vehicle having a main truck comprising a pair of related axles and having means for suspending said main truck from said vehicle, of means comprising a pilot axle for guiding such main truck during rail travel of said vehicle, and positioned between said main axles, an underframe connecting said main axles to maintain them in alignment with each other, a connection between one of said main axles and said pilot axle to maintain alignment therebetween, and means carried by said underframe for raising and lowering said pilot axle from and to rail engaging position.

7. In a combined road and rail vehicle having main and pilot axles, means pivotally connecting said pilot axle to said vehicle, and means for raising and lowering said pilot axle from and to rail engaging position and for transferring a predetermined portion of said vehicle load to said pilot axle, a screw shaft, means universally connecting one end of said screw shaft to said pilot axle, means forming a second universal connection between said screw shaft and said raising and lowering means, and means for bodily rotating one of said universal connections to thereby raise and lower said pilot axle.

8. In a combined road and rail vehicle, having main and pilot axles, means pivotally connecting said pilot axle to said vehicle, and means for raising and lowering said pilot axle from and to track engaging position and for transferring a desired proportion of said vehicle load to said pilot axle, comprising a screw shaft, means forming a universal joint connection between one end of said screw shaft and said pilot axle, a universal joint assembly connected to said vehicle and to said screw shaft, and means for bodily rotating said universal joint assembly to raise and lower said pilot axle.

9. In a combined road and rail vehicle, having a main truck comprising a pair of related main axles, and having means for suspending said main truck from said vehicle, an underframe for maintaining said main axles in alignment, a pilot truck for guiding said main truck, and a suspension connection between said pilot truck and said underframe.

10. In combined road and rail vehicle, having a main truck, including a pair of related main axles, and having means for suspending said main truck from said vehicle, an underframe wishbone connection for maintaining said main axles in alignment, means comprising a pilot axle for guiding said main truck, and mechanism connecting said last named means to said underframe adapted to raise and lower said pilot axle to and from track engaging position.

11. A combined road and rail vehicle comprising, in combination, a main axle, a pilot axle adapted to guide said main axle, means for raising and lowering said pilot axle from and to track engaging position and for transferring a selected portion of said vehicle load to said pilot axle, and means actuable by said transferring means for measuring the transferred load.

12. In a combined road and rail vehicle, having main and pilot axles, means pivotally connecting said pilot axle to said vehicle, and means for raising and lowering said pilot axle from and to track engaging position and for transferring a desired proportion of said vehicle load to said pilot axle, comprising a screw shaft, means forming a universal joint connection between one end of said screw shaft and said pilot axle, a socket member, means rotatably mounting said socket member upon said vehicle, a ball member rotatably received within said socket member and having a driving connection therewith, said ball member having a central threaded opening therein to receive said screw shaft, and means for bodily rotating said socket member to thereby raise and lower said pilot axle.

13. In a combined road and rail vehicle having a frame, the combination of main and pilot axles connected to the frame, said pilot axle being adapted to guide said main axle, means for raising and lowering said pilot axle from and to track-engaging position, comprising a fluid pressure actuated cylinder, and a piston rod operating therein, means universally mounting said cylinder upon said frame substantially directly above said pilot axle, and means universally connecting the rod to said pilot axle.

SULO M. NAMPA.